United States Patent
Zvanut et al.

(10) Patent No.: US 9,350,289 B1
(45) Date of Patent: May 24, 2016

(54) SOLAR PANEL MOUNTING ASSEMBLY (71) Applicants: Jason Zvanut, San Rafael, CA (US); Gabe Cohn, Mill Valley, CA (US)

(72) Inventors: Jason Zvanut, San Rafael, CA (US); Gabe Cohn, Mill Valley, CA (US)

(73) Assignee: MAJI Enterprises, Inc, San Rafael, CA (US)

( * ) Notice: Subject to any disclaimer, the term of this patent is extended or adjusted under 35 U.S.C. 154(b) by 0 days.

(21) Appl. No.: 14/843,909

(22) Filed: Sep. 2, 2015

Related U.S. Application Data (63) Continuation-in-part of application No. 14/576,938, filed on Dec. 19, 2014, now Pat. No. 9,166,522.

(60) Provisional application No. 61/918,375, filed on Dec. 19, 2013.

(51) Int. Cl.
*H02S 20/23* (2014.01)
*F24J 2/52* (2006.01)

(52) U.S. Cl.
CPC ............ *H02S 20/23* (2014.12); *F24J 2/5258* (2013.01); *Y02B 10/12* (2013.01); *Y02E 10/47* (2013.01)

(58) Field of Classification Search
CPC ........ H02S 20/23; H02S 20/24; F24J 2/5258; F24J 2/5207; Y02E 10/47; Y02B 10/10; Y02B 10/12
USPC .................................................. 52/173.3, 263
See application file for complete search history.

(56) References Cited

U.S. PATENT DOCUMENTS

| | | | | |
|---|---|---|---|---|
| 1,911,384 A * | 5/1933 | Olson | ................. | F16B 39/24 411/155 |
| 2,891,492 A * | 6/1959 | Gerosa | ................. | E04D 11/00 404/18 |
| 3,318,057 A * | 5/1967 | Norsworthy | ...... | E04F 15/02452 52/126.6 |
| 3,861,098 A * | 1/1975 | Schaub | ................ | E01C 3/006 52/263 |
| 4,835,924 A * | 6/1989 | Blacklin | ........... | E04F 15/02452 52/263 |
| 6,105,317 A * | 8/2000 | Tomiuchi | ................ | E04D 3/08 52/173.3 |
| 6,520,471 B2 * | 2/2003 | Jones | ..................... | E01C 5/223 248/346.3 |
| 6,625,951 B1 * | 9/2003 | McCarthy | ............. | E04D 11/007 156/297 |
| 6,672,018 B2 * | 1/2004 | Shingleton | ............ | F24J 2/5205 126/621 |
| 7,140,156 B1 * | 11/2006 | Lowe, Jr. | ........... | E04F 15/02183 411/457 |
| 7,435,134 B2 * | 10/2008 | Lenox | ..................... | F24J 2/5245 439/567 |
| 7,780,472 B2 * | 8/2010 | Lenox | ..................... | F24J 2/5211 136/251 |
| 8,156,697 B2 * | 4/2012 | Miros | ..................... | F24J 2/5205 126/623 |

(Continued)

FOREIGN PATENT DOCUMENTS

| | | | | |
|---|---|---|---|---|
| DE | 202010005505 U1 * | 9/2010 | | |
| FR | 2567945 A1 * | 1/1986 | ............. | E04C 2/386 |
| JP | 2011032723 A * | 2/2011 | | |

*Primary Examiner* — James Ference
*Assistant Examiner* — Charissa Ahmad
(74) *Attorney, Agent, or Firm* — Jay P. Hendrickson (57) ABSTRACT

A solar panel mounting assembly for securing a solar panel to a shingled roof with the assembly comprising a mounting block having four mounting block partitions that a form a cross-shaped pattern, with four mounting surfaces extending between and perpendicular to corresponding mounting block partitions, and with the mounting block partitions and corresponding mounting surfaces for use in securing a corner of the solar panel to the solar panel mounting assembly. The remaining corners of the solar panel can be similarly secured using other solar panel mounting assemblies. The solar panel assembly also comprises a flashing panel for flashing the assembly to the singled roof.

3 Claims, 8 Drawing Sheets

(56) References Cited

U.S. PATENT DOCUMENTS

| | | | | |
|---|---|---|---|---|
| 8,505,864 B1* | 8/2013 | Taylor | F24J 2/5258 | 248/226.12 |
| 8,683,761 B2* | 4/2014 | Danning | H02S 20/23 | 136/251 |
| 8,740,163 B1* | 6/2014 | Taylor | H02S 20/23 | 248/226.12 |
| 8,813,441 B2* | 8/2014 | Rizzo | F24J 2/5245 | 248/148 |
| 8,844,215 B2* | 9/2014 | Wildes | H01L 31/0422 | 52/173.3 |
| 8,898,999 B1* | 12/2014 | Kugler | E04F 15/02464 | 52/126.6 |
| 8,925,263 B2* | 1/2015 | Haddock | F24J 2/5258 | 136/251 |
| 9,166,522 B1* | 10/2015 | Zvanut | F24J 2/5258 | |
| 2003/0094193 A1* | 5/2003 | Mapes | F24J 2/5207 | 136/244 |
| 2006/0248814 A1* | 11/2006 | Chen | E04F 15/02476 | 52/126.6 |
| 2009/0200443 A1* | 8/2009 | Burtscher | F24J 2/5205 | 248/316.1 |
| 2010/0269428 A1* | 10/2010 | Stancel | F24J 2/5205 | 52/173.3 |
| 2011/0036028 A1* | 2/2011 | Beck | F24J 2/5203 | 52/173.3 |
| 2011/0138585 A1* | 6/2011 | Kmita | F24J 2/5258 | 24/522 |
| 2011/0214365 A1* | 9/2011 | Aftanas | F24J 2/5258 | 52/173.3 |
| 2011/0260027 A1* | 10/2011 | Farnham, Jr. | F24J 2/5207 | 248/309.1 |
| 2011/0271611 A1* | 11/2011 | Maracci | F24J 2/5245 | 52/173.3 |
| 2013/0291479 A1* | 11/2013 | Schaefer | F24J 2/5245 | 52/745.21 |
| 2013/0340358 A1* | 12/2013 | Danning | B23P 11/00 | 52/126.7 |

* cited by examiner

SOLAR PANEL MOUNTING ASSEMBLY

PRIORITY

This application is a continuation-in-part application of U.S. nonprovisional application Ser. No. 14/576,938, which relates to and claims the benefit under 35 U.S.C. §119(e) of U.S. provisional application No. 61/918,375 filed on Dec. 19, 2013.

TECHNICAL FIELD

This application relates to mounting assemblies for securing photovoltaic solar panels to a structure such as a roof on a building.

BACKGROUND

Solar energy collection panels are typically mounted on rooftops with an elevated framing system consisting of vertical stanchions, normally secured to roof joists and lateral rails. Since the vertical stanchions must extend through the roof decking to reach the joists, sheet metal flashing must be installed around the openings in order to prevent leakage. The lateral rails are then bolted to the top of the stanchions, upon which the solar panels are fastened using clamps and bolts, while the structure is held in place by field installation personnel. This type of system allows many different solar panel types and sizes to comply with typical structural member spacing of 24" to 32" on center, but requires a substantial collection of specialized hardware components and intensive field labor to measure, cut, drill, and attach the hardware to the rooftop.

A recent attempt to overcome some of the limitations of elevated framing systems is disclosed in U.S. Pat. No. 8,424,255 ('255 Patent). The '255 Patent discloses the utilization of mounting assemblies that appear to replace use of vertical stanchions and attached lateral rails as in the prior art. However the patent's mounting assembly does not disclose or suggest any structure that is integral with the assembly that could be used to simultaneously align a solar panel both longitudinally and latitudinally on the roof of a structure. In fact, the patent actually teaches away from providing a mounting assembly that provides for a bi-directional alignment of a solar panel since the patent discloses and illustrates that a separate layout tool should be used to ensure that the solar panels are aligned properly along "two axes" (Col 6, lines 36-50).

SUMMARY OF THE INVENTION

A solar panel mounting assembly for securing a solar panel to a shingled roof is presented which comprises a mounting block comprising: four mounting block partitions that are integral with a top end of the mounting block, with each mounting block partition perpendicular and adjacent to corresponding adjacent mounting block partitions, with an end of each mounting block partition integral with a mounting block center section that extends from a mounting block top surface to a mounting block bottom surface, and with a mounting block opening through the mounting block center section; and four mounting surfaces, with each mounting surface extending between and perpendicular to corresponding mountain block partitions. The solar panel mounting assembly further comprises a flashing panel having a flashing panel opening through the flashing panel; a base block having a base block opening extending through the base block and a plurality of fastener openings also extending through the base block, with the plurality of fastener openings for use with fasteners in securing the base block to the shingled roof; a threaded male member that can be disposed through the base block opening, flashing panel opening, and mounting block opening, with a top portion of the threaded male member extending away from the mounting block top surface; a mounting plate having a plate opening that extends from a plate top surface to a plate bottom surface, with the plate opening for positioning the mounting plate around the top portion of the threaded male member, and with the mounting plate having grounding serrations integral with the mounting plate bottom surface; and a mounting plate fastener having integral female threads for attachment to the top portion of the threaded male member; whereby the solar panel can be secured to the shingled roof by: utilizing four solar panel mounting assemblies, with the solar panel assemblies assembled and secured to the shingled roof by disposing four base blocks around four corresponding threaded male members and fastening the base blocks to the shingled roof at predetermined locations; disposing four flashing panels around four corresponding threaded male members; disposing four mounting blocks around four corresponding threaded male members; placing the corners of the solar panel on the mounting surfaces of corresponding mounting blocks; disposing four mounting plates around four corresponding threaded male members; engaging four integral female thread portions within corresponding mounting plate fasteners to the top portions of four corresponding threaded male members; and rotating the four mounting plate fasteners in order to contact four corresponding mounting plates, thereby securing the solar panel to the four solar mounting assemblies and engaging corresponding mounting plate serrations with the solar panel.

DETAILED DESCRIPTION OF THE INVENTION

Figures 1A, 1B, 1C:
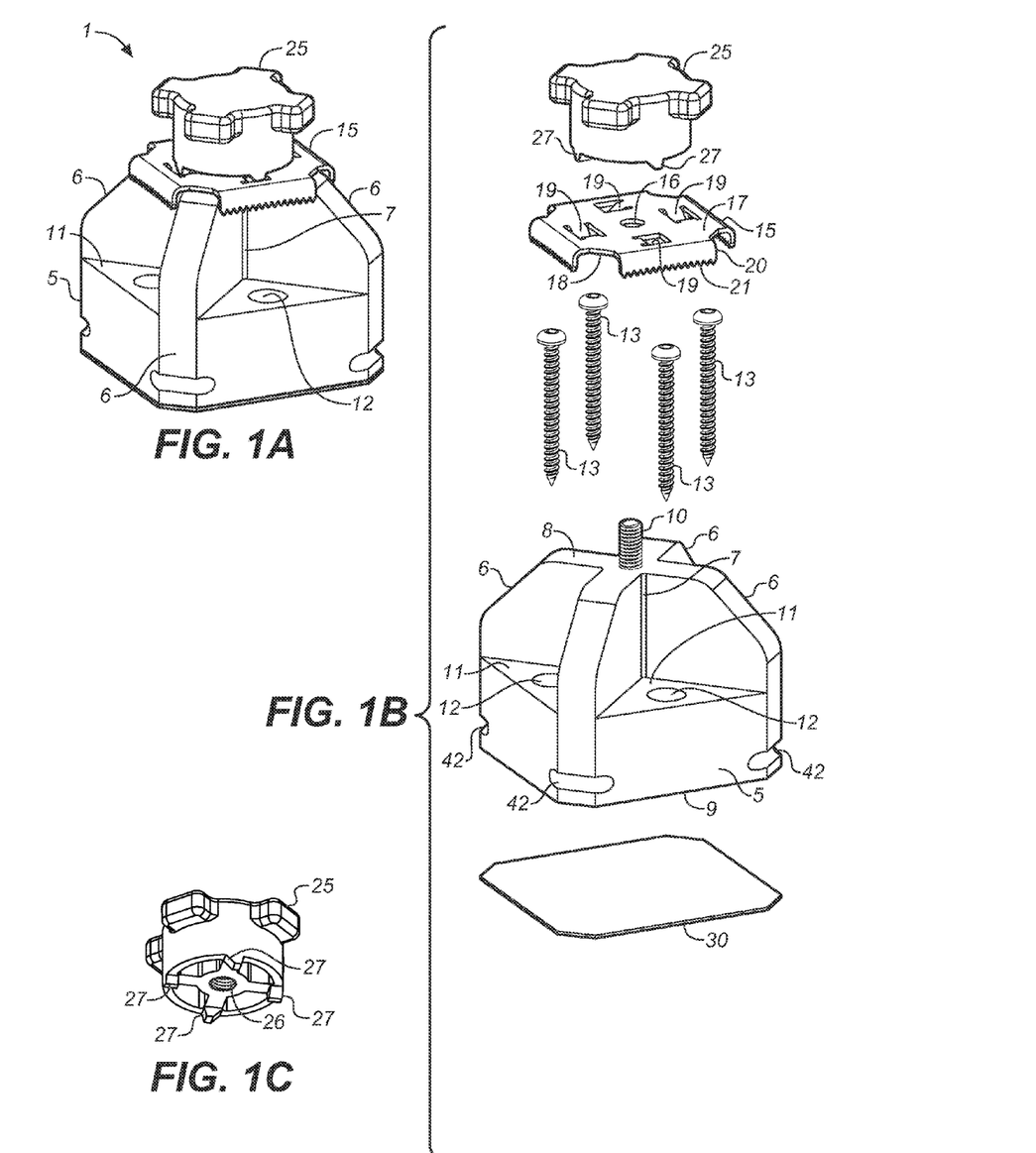
FIG. 1A is a perspective view of the solar panel mounting assembly
FIG. 1B is an exploded view of the solar panel mounting assembly.
FIG. 1C is a perspective view of the fastener cap, showing the bottom end of the fastener cap.

FIG. 1A and FIG. 1B illustrate a perspective view and an exploded view, respectively, of the solar panel mounting assembly 1 that can be used to mount an array of solar panels 50 to a structure, typically the roof of a building. The term "solar panel" refers to a class of photoelectric rectangularly-shaped panels having four perpendicular sides and a conductive material disposed around the perimeter of the rectangularly-shaped panel. As shown, the solar panel mounting assembly 1 comprises a mounting block 5 having four mounting block partitions 6 that are integral with a top end of the mounting block 5, with the four mounting block partitions 6 forming a "cross-shaped" pattern with each mounting block partition 6 being perpendicular to adjacent mounting block partitions 6, and with an end of each mounting block partition 6 being integral with a mounting block center section 7 that extends from a mounting block top surface 8 to a mounting block bottom surface 9. As shown in more detail in FIG. 2A and FIG. 2B, a threaded male member 10 is disposed within an elongate opening 35 through the mounting block center section 7, with a portion of the threaded male member 10 extending away from the mounting block center section 7. Four mounting surfaces 11 extend between and are perpendicular to corresponding mounting block partitions 6, with each of the mounting surfaces 11 having a fastener opening 12 that extends from the mounting surface 11 to the mounting block bottom surface 9.

As also shown in the figures, the solar panel mounting assembly 1 further comprises a rectangular mounting plate 15 made of an electrically conductive material, with the mounting plate 15 having a plate opening 16 that extends from a plate top surface 17 to a plate bottom surface 18, with the plate opening 16 for positioning the mounting plate 15 around the threaded male member 10. The mounting plate 15 also comprises: 1) four locking flanges 19 with associated openings, with the locking flanges extending downward from the plate top surface 17; and 2) four edge segments 20 that extend generally downward from the plate top surface 17, with an end portion of each edge segment 20 having grounding serrations 21. Also illustrated is a fastener cap 25 which, as shown in FIG. 1C, comprises an internal threaded female member 26 that can be used to screw the fastener cap 25 onto the mounting block's threaded male member 10. The fastener cap 25 further comprises four locking projections 27 disposed around the bottom perimeter of the fastener cap 25, with the locking projections 27 positioned so as to engage the mounting plate's four locking flanges 19 when the fastener cap 25 is hand tightened down to securely engage the mounting plate 15.

Figure 2A:
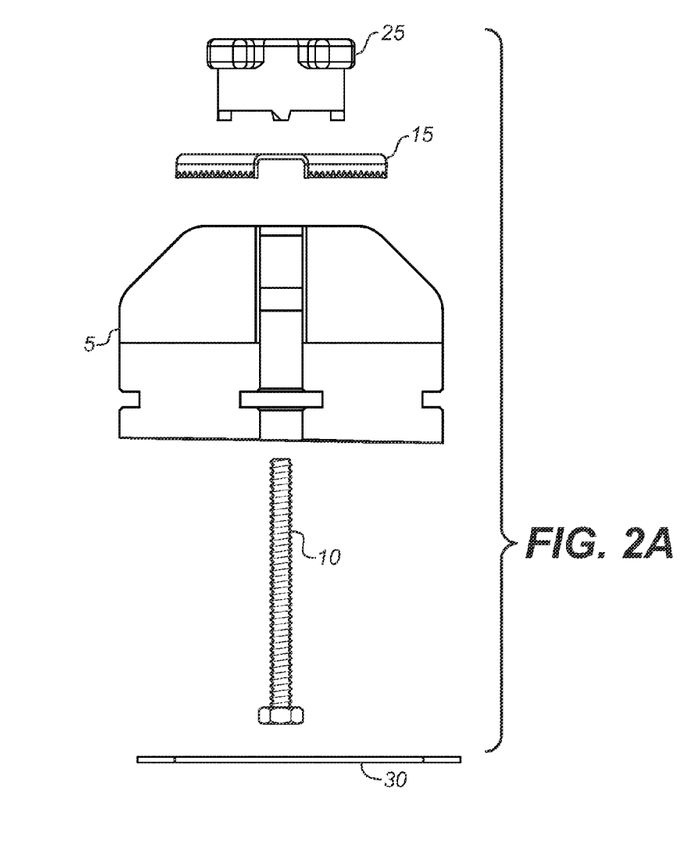
FIG. 2A is a side view of the solar panel mounting assembly.
Figure 2B:
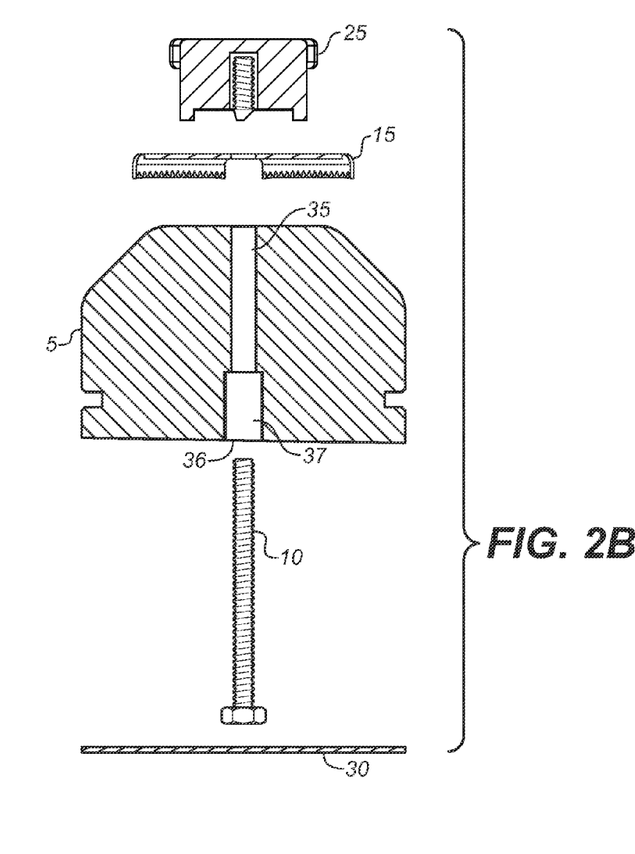
FIG. 2B is a cross-sectional side view of the solar panel mounting assembly.

Referring now to FIG. 2A and FIG. 2B, the figures further illustrate in exploded views that the threaded male member 10 can be disposed within the elongate opening 35 by inserting the threaded end of the threaded male member 10 into a bottom end 36 of elongate opening 35, with the head of the threaded male member 10 engaging a cavity 37 to prevent the threaded male member 10 from turning when the fastener cap 25 is screwed onto the threaded male member 10.

Figure 3:
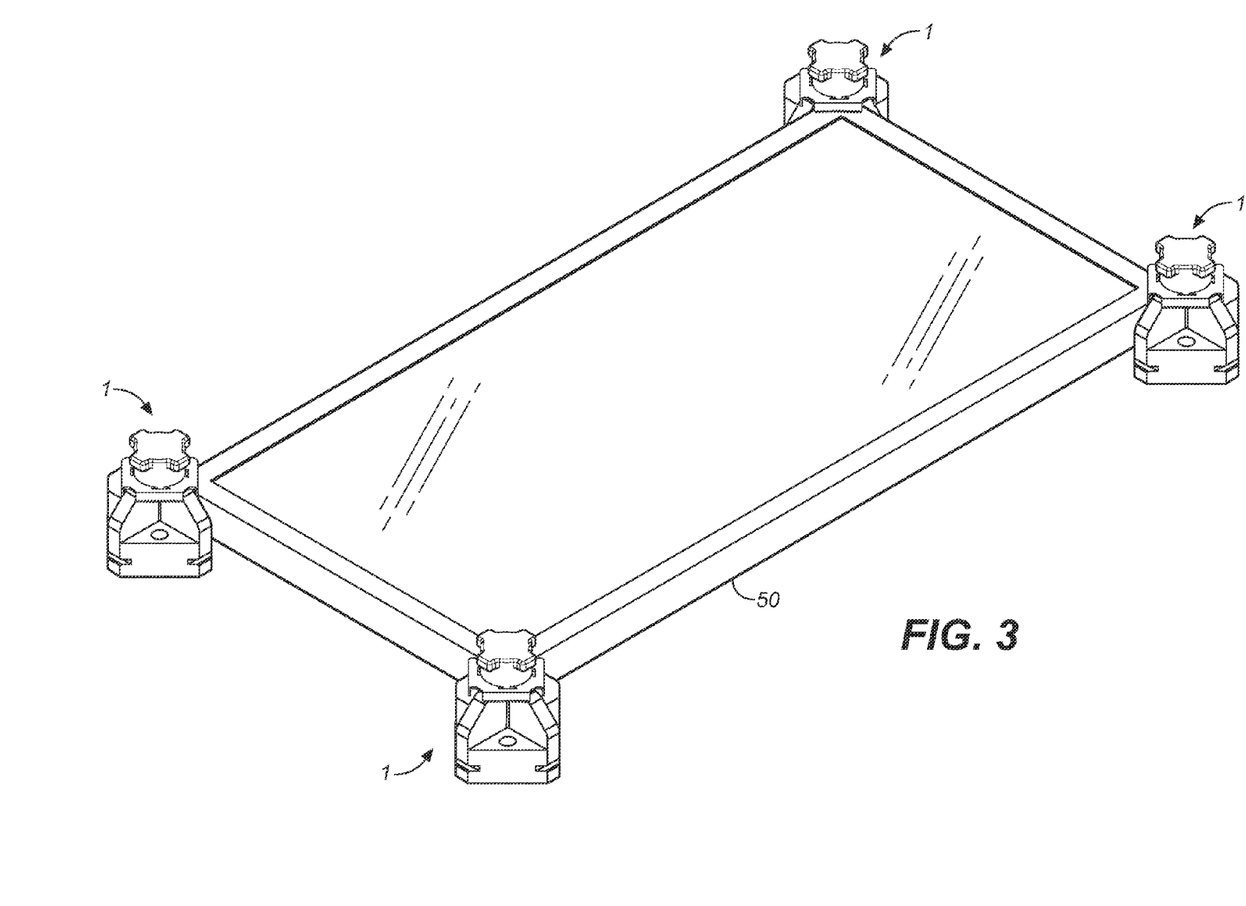
FIG. 3 is a perspective view of solar mounting assemblies attached to a solar panel.

As illustrated in FIG. 3, the mounting block assembly 1 can be used to mount at least one rectangular-shaped solar panel 50 to a building structure such as a roof, with each solar panel corner supported by and attached to a mounting block assembly 1 that is attached to the roof. Installation of a solar panel 50 on a roof is preferably performed by initially positioning the solar panel 50 on the roof in the desired location and placing a mounting block 5 under each of the solar panel's corners by resting each corner on the mounting surface 11 of a corresponding mounting block 5 and abutting each corner to adjacent mounting block partitions 6. And, a mounting gasket 30, as shown in FIG. 1A and FIG. 1B, can be positioned between the roof surface and the mounting block bottom surface 9 in order to provide a sealed connection between the two surfaces. Fasteners 13, for example the screws as shown in FIG. 1B, can be utilized to attach the mounting blocks 5 to the roof surface by inserting the fasteners 13 into the fastener openings 12 and screwing the fasteners 13 into the roof structure. However, since the solar panel 50 will be covering up one of the fastener openings 12 on each mounting block, it will only be possible to the screw fasteners 13 through the three fastener openings that are uncovered. Rather than being a limitation, however, this feature is a significant advantage of the solar panel mounting assembly 1. Since each mounting block 5 has a "cross-shaped" pattern with the mounting block partitions 6 perpendicular to adjacent mounting block partitions 6, the four mounting blocks can be utilized to accurately and simultaneously align the solar panel 50 in both a longitudinal and a latitudinal direction on the roof, without the use of any other alignment procedures. Once the four mounting blocks 5 are secured to the roof, the solar panel 50 can be briefly lifted off of the mounting blocks 5; a fastener 13 can be screwed through each of the four fastener openings 12 that were previously covered by the solar panel; and the solar panel re-placed on the mounting blocks 5, resting on the mounting surfaces 11.

Figure 4A:
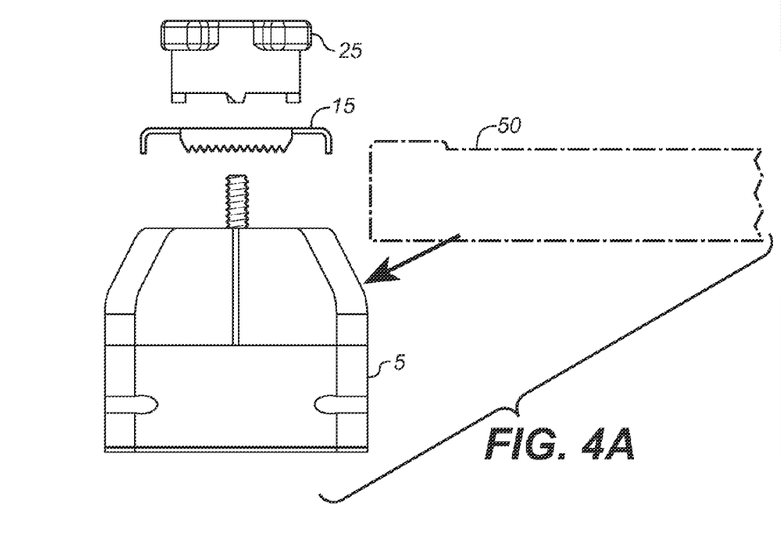
FIG. 4A is a partial exploded side view of the solar panel mounting assembly, illustrating the positioning of a solar panel adjacent to the assembly.
Figure 4B:
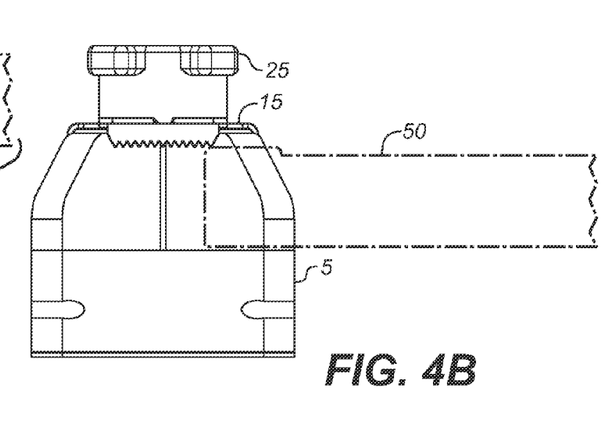
FIG. 4B is a side view of the solar panel mounting assembly, illustrating a solar panel that is resting on a mounting surface within the solar panel mounting assembly.
Figure 4C:
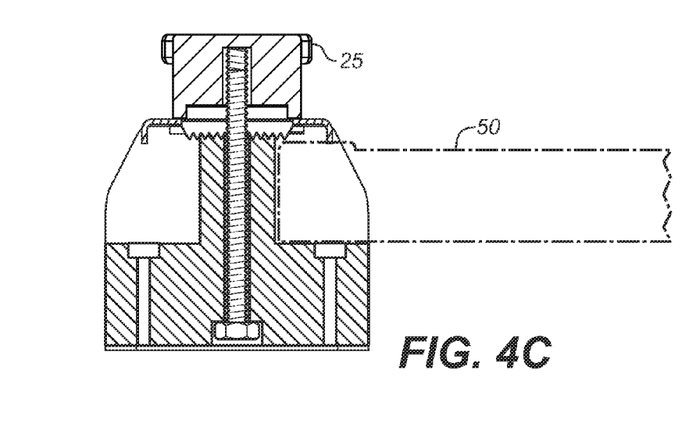
FIG. 4C is a cross-sectional side view of the solar panel mounting assembly, illustrating a solar panel that is resting on a mounting surface within the solar panel mounting assembly.

The solar panel corners can then be secured to the four mounting blocks 5 by placing the mounting plate 15 around the threaded male member 10 of each mounting block 5 and screwing the fastener cap 25 onto each threaded male member 10 until the locking projections 27 on the faster cap 25 engage the locking flanges 19 on the mounting plate 15. The mounting blocks 5 can be sized such that when the solar panel 50 is positioned on the mounting blocks 5, the top metal edge of the solar panel is approximately flush with the mounting block top surface 9. When each fastener cap 25 is locked into place, the grounding serrations 20 on a corresponding mounting plate 15 will contact and slightly depress the electrically conductive material that is disposed around the perimeter of the solar panel 50, thereby ensuring an electrically grounded connection between each mounting plate 15 and the solar panel 50. FIG. 4A and FIG. 4B illustrate in more detail the positioning of the solar panel 50 (shown in dotted lines) on the mounting surface 11 of each mounting block 5 and the engagement of the mounting serrations 21 of each mounting plate 15 with the electrically conductive material around the perimeter the solar panel 50.

Figure 5:
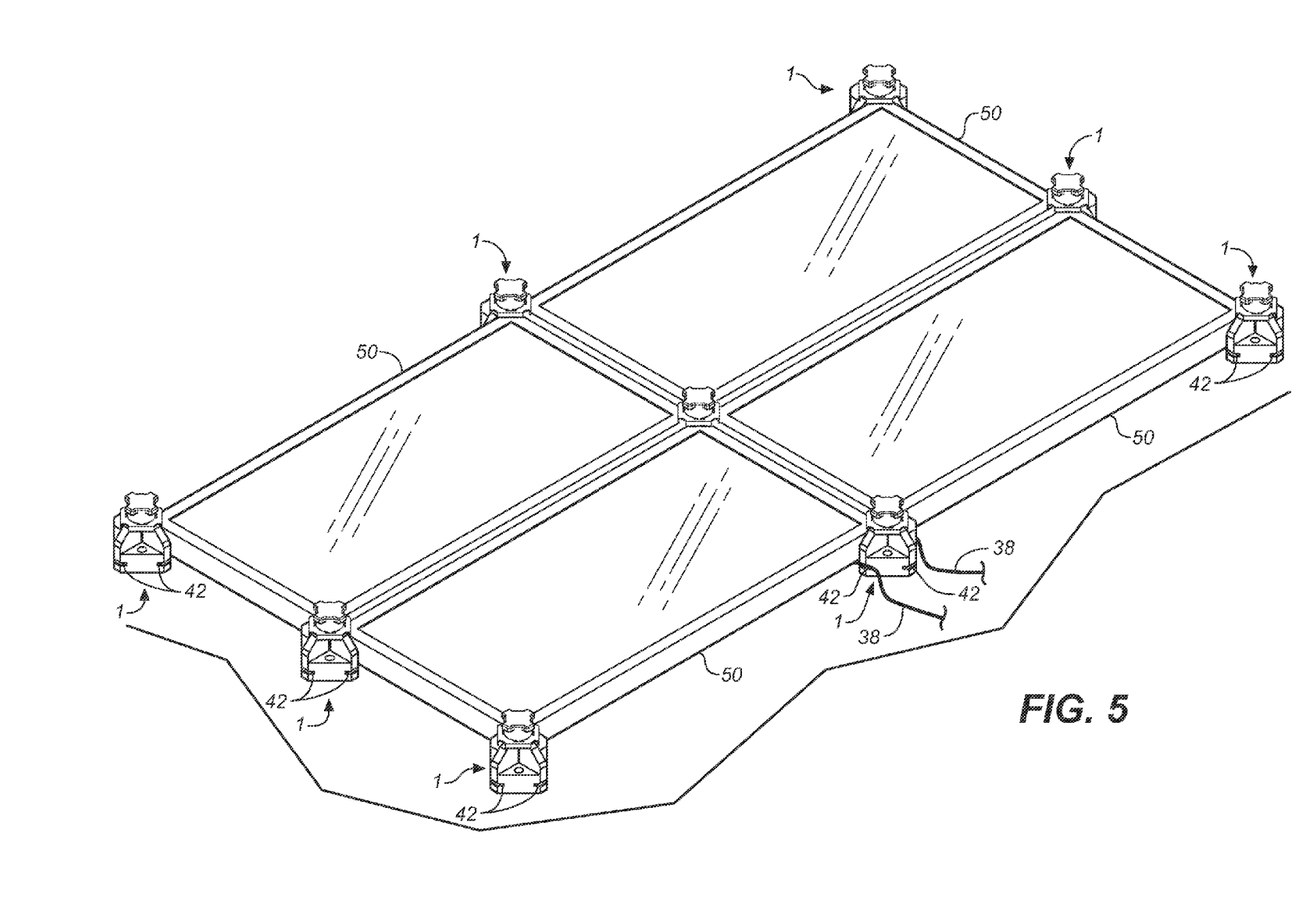
FIG. 5 is a perspective view of an array of solar panels that are connected together using nine solar panel assemblies that can be attached to a building structure, such as a roof.

In addition to mounting a single solar panel on a roof, the solar panel mounting assemblies 1, as illustrated in FIG. 5, can be used to mount an array of adjacent solar panels 50, forming longitudinal rows and latitudinal columns of solar panels. Preferably, the first step in installing an array of solar panels 50 is to attach four mounting blocks 5 to the roof as described above in connection with the mounting of a single solar panel 50. These mounting blocks, referred to herein as "a set of aligning blocks", can then be used to align, both longitudinally and latitudinally, all of the other adjacent solar panels 50 and their corresponding mounting blocks 5 in the array. More specifically, at least one solar panel out of the array of solar panels 50 is positioned adjacent to two of the adjacent aligning blocks 5 out of the set of aligning blocks, and adjacent corners of the solar panel are placed on mounting surfaces 11 of the adjacent aligning blocks 5, with the adjacent corners of the solar panel abutting aligning block partitions 6 integral with the adjacent aligning blocks 5. Then, the other two adjacent corners of the solar panel are placed on mounting surfaces 11 of corresponding mounting blocks 5, with the adjacent corners of the solar panel abutting the mounting block partitions 6 integral with the mounting blocks 5. Once the solar panel 50 is thereby positioned, the mounting blocks 5 are secured to the structure using fasteners 13. In this manner, the utilization of the aligning blocks 5 on one end of the solar panel and mounting blocks 5 on the other end, aligns the at least one solar panel out of the array of solar panels 50 in the same longitudinal and latitudinal orientation as the single solar panel that was used to establish the positions of the aligning blocks 5. And, additional solar panels out of the array of solar panels 50 can be positioned on other aligning blocks and mounting blocks in the same manner to add to the array of solar panels 50. As in the installation of the single solar panel, the array of solar panels 50 are secured to the aligning blocks and mounting blocks by using the mounting plate 15 and fastener cap 25. When the mounting plate 15 is installed its grounding serrations 21 contact the conductive corners of each of the solar panels in the array of solar panels 50, which in turn creates a continuous electrical grounding path between all of the solar panels in the array. Each solar panel mounting assembly 1 can also comprise a plurality of notches 42 integral with an outside surface of the mounting block 5, with the notches 42 for use in holding electrical wires 38 conducting electrical current from the solar panel off of the structure.

Figure 6:
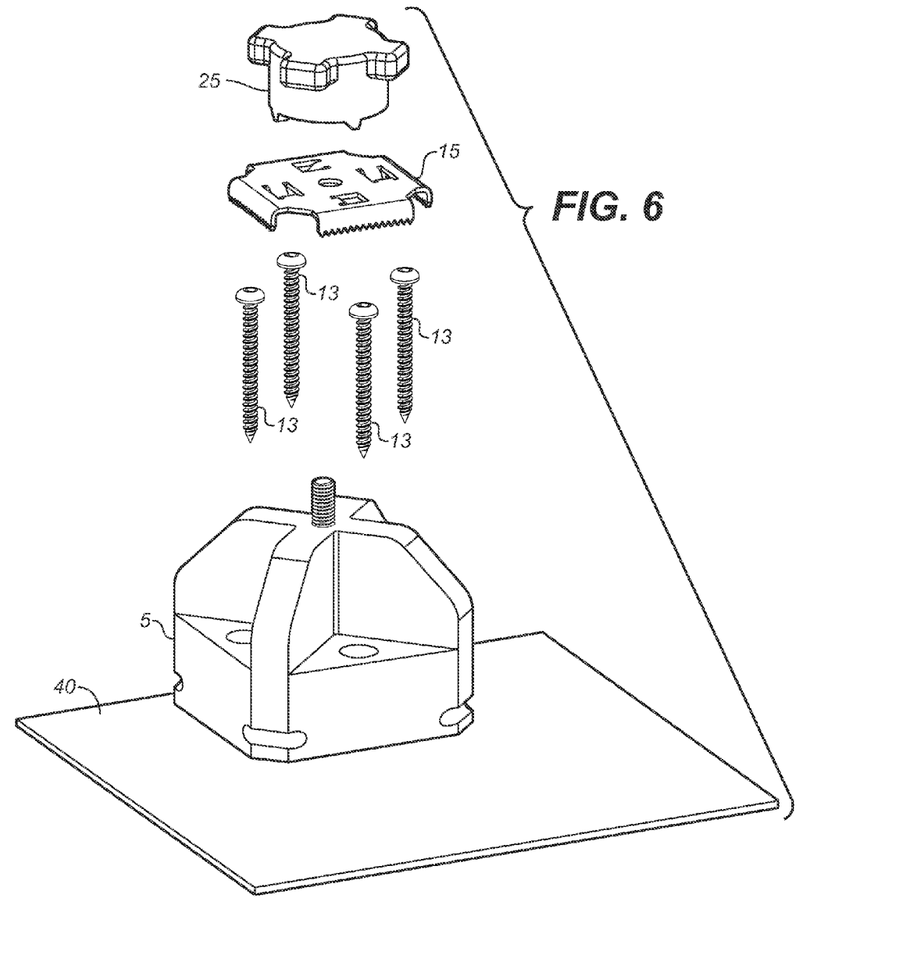
FIG. 6 is an exploded view of the solar panel mounting assembly having an integral flashing panel.

Another embodiment of the solar panel mounting assembly is illustrated in FIG. 6. In this embodiment, the solar panel mounting assembly 1 is identical to the assembly described in the previous figures, except for the addition of a flashing panel 40 that is integral with the mounting block bottom surface 9 and extends away from the mounting block 5. When the solar panel mounting assembly 1 with the flashing panel 40 is used to mount solar panels 50, the gasket 30 is not needed, because one edge of the flashing panel 40 can be disposed under, for example, roof shingles in order to divert water away from the underside of the solar panel mount assembly 1.

Figure 7A:
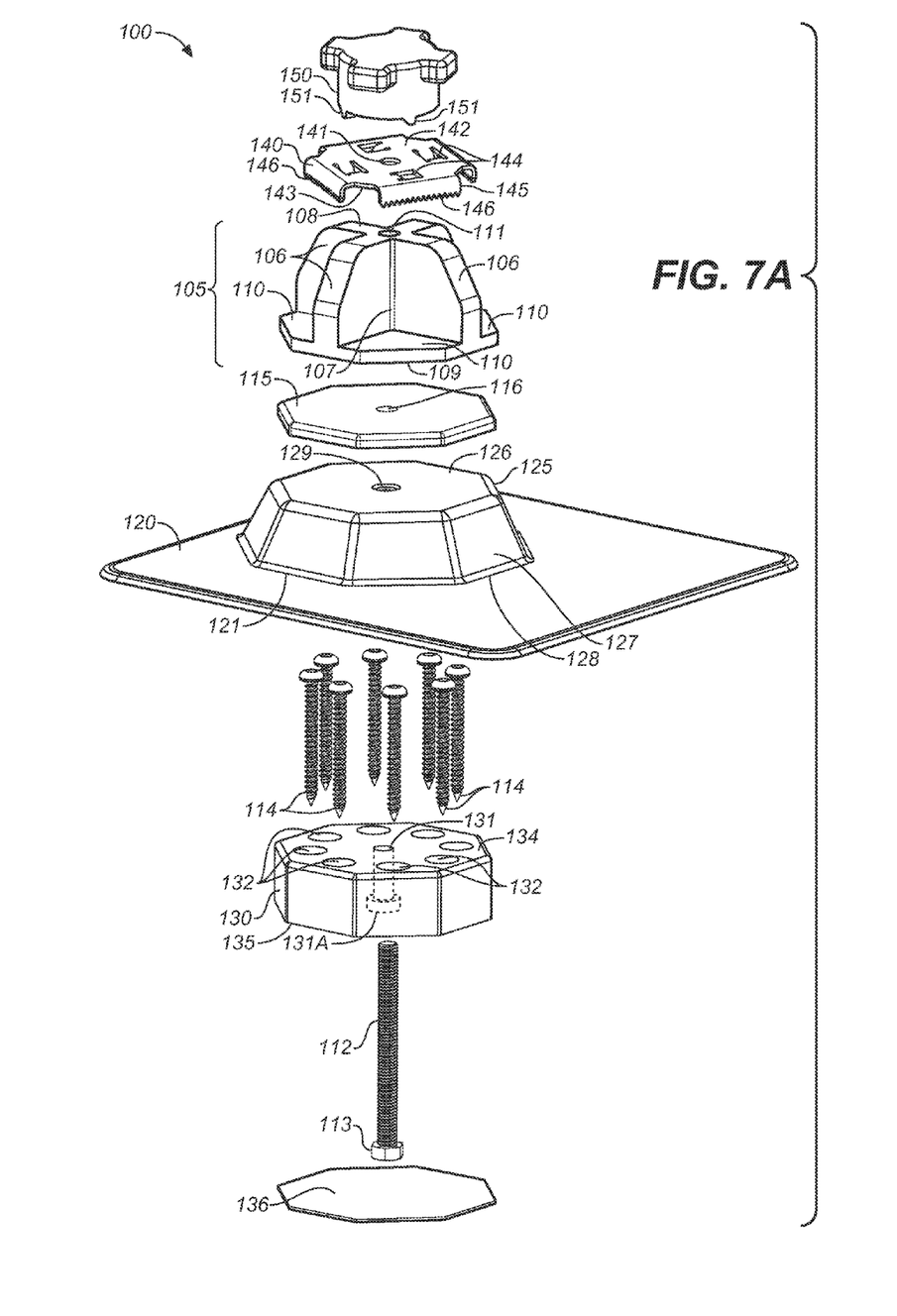
FIG. 7A is a perspective, exploded view of another embodiment of the solar panel mounting assembly.

An additional embodiment of a solar panel mounting assembly 100 is illustrated in the perspective and exploded view of FIG. 7A. Just as in the solar panel mounting assembly 1, solar panel mounting assembly 100 can be used to mount an array of solar panels 50 to a structure, typically the roof of a building, but is more specifically intended to be mounted to a shingled roof. As used herein, a "shingled roof" means a roof covered with individual overlapping elements, which typically have flat, rectangular shapes, with the elements laid in horizontal courses along the surface of the roof. As shown in the figure, the solar panel mounting assembly 100 comprises a mounting block 105 made of an electrically nonconductive material such as a polymeric material, with the mounting block 105 having four mounting block partitions 106 that are integral with a top end of the mounting block 105, with the four mounting block partitions 106 forming a "cross-shaped" pattern with each mounting block partition 106 being perpendicular to adjacent mounting block partitions 106, and with an end of each mounting block partition 106 being integral with a mounting block center section 107 that extends from a mounting block top surface 108 to a mounting block bottom surface 109 having an octagonal shape, and with a mounting block elongate opening 111 extending through the mounting block center section 107. The mounting block elongate opening 111 for use, as describe below, in assembling the solar panel mounting assembly 100. And, four mounting surfaces 110 extend between and are perpendicular to corresponding mounting block partitions 106.

The solar panel mounting assembly 100 also comprises a spacer plate 115 having an octagonal shape and a spacer plate opening 116 through the center of the spacer plate 115, with the spacer plate 115 for varying the distance between the mounting surfaces 110 within the mounting block 105 and the shingled roof. In addition, the solar panel mounting assembly 100 comprises a flashing panel 120, preferably having a rectangular shape, with the flashing panel 120 having an octagonally shaped flashing panel opening 121 through the flashing panel 120 and with the flashing panel 120 also having a housing 125 that is integral with the flashing panel 120. The housing 125 has a top end 126 that is integral with an octagonally shaped sidewall 127 that defines an octagonally shaped housing bottom opening 128 that is coextensive with the octagonally shaped flashing panel opening 121, with the top end 126 of the housing 125 having a housing top opening 129 through the top end 126 also for use in assembling the solar panel mounting assembly 100. The solar panel mounting assembly 100 further comprises a base block 130 having an octagonal shape, with a base block elongate opening 131 through the center of the base block 130 from a base block top surface 134 to a base block bottom surface 135, with the base block elongate opening 131 also for use in assembling the solar panel mounting assembly 100. A plurality of fastener elongate openings 132 are provided around the perimeter of the base block 130 and extending through the base block 130, with the plurality of fastener elongate openings 132 for use with fasteners 114 in securing the base block to the shingled roof. And, a gasket 136 having an octagonal shape can be used to provide a watertight seal between the base block bottom surface 135 and a shingle within the shingled roof. The spacer plate 115, flashing panel 120, including integral housing 125, and base block 130 are all made of an electrically nonconductive material such as a polymeric material.

In addition, the solar panel mounting assembly 100 comprises mounting plate 140 and a mounting plate fastener cap 150 for use in securing and grounding the mounting plate 140 to the solar panel 50. The mounting plate 140 can be rectangular in shape and made of an electrically conductive material such as stainless steel, with the mounting plate 140 having a mounting plate opening 141 that extends through the center of the mounting plate 140 from a plate top surface 142 to a plate bottom surface 143, with the mounting plate opening 141 also for use in assembling the solar panel mounting assembly 100. The mounting plate 140 additionally comprises: a plurality, preferably four, integral locking flanges 144 with associated openings, with the locking flanges 144 extending downward from the plate top surface 142; and four integral edge segments 145 that extend generally downward from the plate top surface 142, with an end portion of each edge segment 145 having integral grounding serrations 146. An underside of the mounting plate fastener cap 150 has an integral female thread portion that is also for use in assembling the solar panel mounting assembly 100 (the female threads 26 are shown in FIG. 10, which illustrates a fastener cap 25 that is identical to fastener cap 150). The mounting plate fastener cap 150 further comprises a plurality, preferably four, locking projections 151 disposed around the bottom perimeter of the fastener cap 150, with the locking projections 151 positioned so as to engage the mounting plate's four locking flanges 144 during the assembly of the solar panel mounting assembly 100. Persons skilled in the art will recognize that other mounting plate fasteners, like a nut, could be used in place of the fastener cap 150.

Figure 7B:
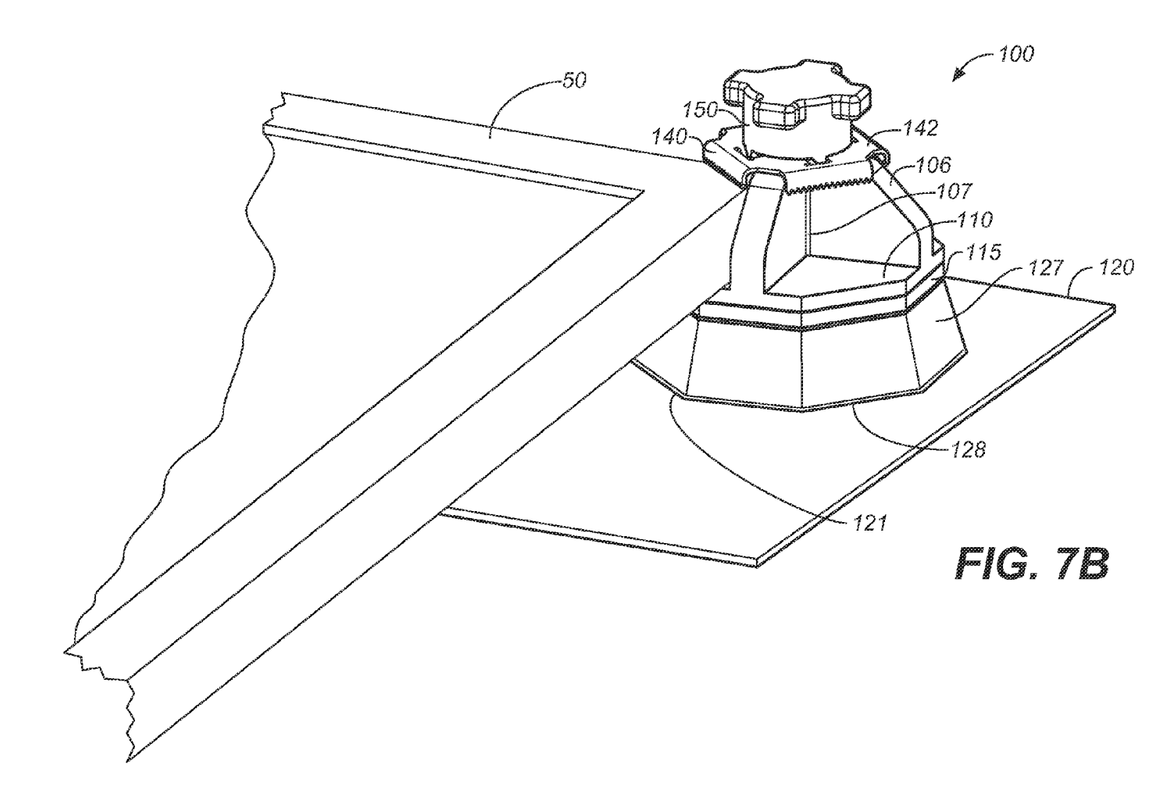
FIG. 7B is a perspective view of the assembled solar mounting assembly shown in FIG. 7A.

The solar panel mounting assembly 100 further comprises a threaded male member 112 having a head 113, with the threaded male member 112 for use in connecting all of the other components that comprise the solar panel mounting assembly 100 and at the same time for use in securing the assembly 100 to the roof. The threaded male member 112 can be inserted into the base block opening 131 such that a top portion of the threaded male member 112 extends above the base block top surface 134 of the base block 130 and the head 113 engages a cavity 131A (shown in dashed lines) that is concentric with the base block opening 131 and located adjacent to the of the base block bottom surface 135. The base block 130 can be secured to the roof by using the fasteners 114 extending through a corresponding plurality of fastener elongate openings 132, with the fasteners 114 attaching the base block bottom surface 135 to a roof shingle, with the fasteners 114 extending partially through the shingled roof. Preferably, however, the gasket 136 can be positioned between the base block bottom surface 135 and the top of the shingle in order to provide a watertight seal between the two surfaces. The flashing panel 120 can then be positioned adjacent to the base block by disposing the flashing panel 120 around the threaded male member 112 by inserting the threaded male member 112 through the top opening 129 through the top end 126 of the housing 125 that is integral with the flashing panel 120. As the flashing panel 120 is brought into contact with the base block 135, the base block 130 extends through the coextensive openings, 121 and 128, through the flashing panel 120 and housing 125, respectively and into the housing 125. The threaded male member 112 can then be inserted through the spacer plate opening 116 within the spacer plate 115, the mounting block elongate opening 111 within the mounting block 105, and the mounting plate opening 141 within the mounting plate 140. Assembly of the solar panel mounting assembly 100 is then completed by attaching the mounting plate fastener cap 150 to the top end of the threaded male member 112 using the integral female thread portion within the fastener cap 150. FIG. 7B illustrates the completely assembled solar panel mounting assembly 100, along with an illustration of the attachment of a corner of a solar panel 50 to the solar panel mounting assembly 100, as described below.

A solar panel 50 can be secured to the shingled roof by utilizing four of the solar panel mounting assemblies 100 described above. Specifically, four base blocks 130 can be secured to the shingled roof by first disposing four threaded male members 112 through base block elongate openings 131 within corresponding base blocks 130, with a top portion of each threaded male member 112 extending away from a corresponding base block top surface 134 and then securing the four base blocks 130 to the shingled roof by using the fasteners 114. The four mounting blocks 130 can be secured to the shingled roof at a predetermined location that will ensure that each corner of a solar panel 50 will rest on a corresponding mounting surface 110 of a mounting block 105 and that a top edge of the flashing panel 120 can be partially disposed under a bottom edge of a roof shingle. Next, four flashing panels 120 can be disposed around the top portions of four corresponding threaded male members 112 by inserting the top portions of threaded male members 112 through housing top openings 129 within the top ends 126 of corresponding housings 125. Four spacer plates 115 then are similarly disposed around the top portions of four corresponding threaded male members 112 by inserting the top portions of threaded male members 112 through spacer plate openings 116 within corresponding spacer plates 115. Similarly, four mounting blocks 105 can be disposed around the top portions of four corresponding threaded male members 112 by the inserting top portions of treaded male members 112 through mounting block elongate openings 111 within corresponding mounting blocks 105. A solar panel 50 then can be disposed between the four mounting blocks 105 by placing the four corners of the solar panel 50 on mounting surfaces 110 of corresponding mounting blocks 105. The solar panel 50 can be partially secured to the shingled roof by disposing four mounting plates 140 around top portions of four corresponding threaded members 112 by inserting the top portions of the threaded members 112 through mounting plate openings 141 within corresponding mounting plates 140 and by disposing four mounting plate fastener caps 150 around the top portions of four corresponding threaded members 112 by attaching the top portions of threaded members 112 to corresponding female thread portions that are integral with the underside of the mounting plate fastener caps 150. With the solar panel 50 resting on the mounting surfaces 110 of corresponding mounting blocks 105, the solar panel 50, as illustrated in FIG. 7B, the solar panel 50 can be completely secured and grounded to the solar panel mounting assembly 100 by rotating the mounting plate fastener caps 150 until the grounding serrations 146 of corresponding mounting plates 140 engage the solar panel 50, which creates the potential for an electrical connection between the solar panel and the mounting plates 140 within corresponding solar panel mounting assemblies 100. And, just as described and illustrated in FIG. 5 in connection with the use of solar panel assembly 1, additional solar panel mounting assemblies 100 can also be used in the same manner to create an array of adjacent solar panels 50 secured to the shingled roof, with each solar panel 50 in the array supported by the mounting surfaces 110 within a corresponding mounting block 105 and with the grounding serrations 146 integral with a corresponding mounting plate 145 contacting the electrically conductive corners of adjacent solar panels, thereby creating a continuous electrical grounding path between all of the panels in the array.

Although a preferred embodiment and other embodiments have been described, it will be recognized by those skilled in the art that other embodiments and features may be provided without departing from the underlying principals of those embodiments. The scope of the invention is defined by appended claims.

The invention claimed is:
1. A solar panel mounting assembly for securing a solar panel having corners to a shingled roof, comprising:
    a mounting block comprising:
        four mounting block partitions that are integral with a top end of the mounting block, with each mounting block partition perpendicular and adjacent to corresponding adjacent mounting block partitions, with an end of each mounting block partition integral with a mounting block center section that extends from a mounting block top surface to a mounting block bottom surface, and with a mounting block opening through the mounting block center section; and
        four mounting surfaces, with each mounting surface extending between and perpendicular to corresponding mounting block partitions;
    a flashing panel having a flashing panel opening through the flashing panel;
    a base block having a base block opening extending through the base block and a plurality of fastener openings also extending through the base block, with the plurality of fastener openings for use with fasteners in securing the base block to the shingled roof;
    a threaded male member that can be disposed through the base block opening, flashing panel opening, and mounting block opening, with a top portion of the threaded male member extending away from the mounting block top surface;

a mounting plate having a plate opening that extends from a plate top surface to a plate bottom surface, with the plate opening for positioning the mounting plate around the top portion of the threaded male member, and with the mounting plate having grounding serrations integral with the mounting plate bottom surface; and a mounting plate fastener having integral female threads for attachment to the top portion of the threaded male member;

whereby the solar panel can be secured to the shingled roof by: utilizing four solar panel mounting assemblies, with the solar panel assemblies assembled and secured to the shingled roof by disposing four base blocks around four corresponding threaded male members and fastening the base blocks to the shingled roof at predetermined locations; disposing four flashing panels around the four corresponding threaded male members; disposing four mounting blocks around four corresponding threaded male members; placing the corners of the solar panel on the mounting surfaces of corresponding mounting blocks; disposing four mounting plates around four corresponding threaded male members; engaging four integral female thread portions within corresponding mounting plate fasteners to the top portions of four corresponding threaded male members; and rotating the four mounting plate fasteners in order to contact four corresponding mounting plates, thereby securing the solar panel to the four solar mounting assemblies and engaging corresponding mounting plate serrations with the solar panel.

2. The solar mounting assembly as in claim 1 further comprising a spacer plate having an opening for disposing the spacer plate around the threaded male member, with the spacer plate for use in varying the distance between the mounting surfaces within the mounting block and the shingled roof.

3. The solar mounting assembly as in claim 1 further comprising a gasket for placement between the base block and a shingle within the shingled roof, with the gasket for providing a watertight seal between the base block and the shingle.

* * * * *